No. 757,836. PATENTED APR. 19, 1904.
J. A. PAUTASSO.
PHOTOGRAPHIC CAMERA.
APPLICATION FILED JULY 31, 1901.
NO MODEL. 2 SHEETS—SHEET 1.
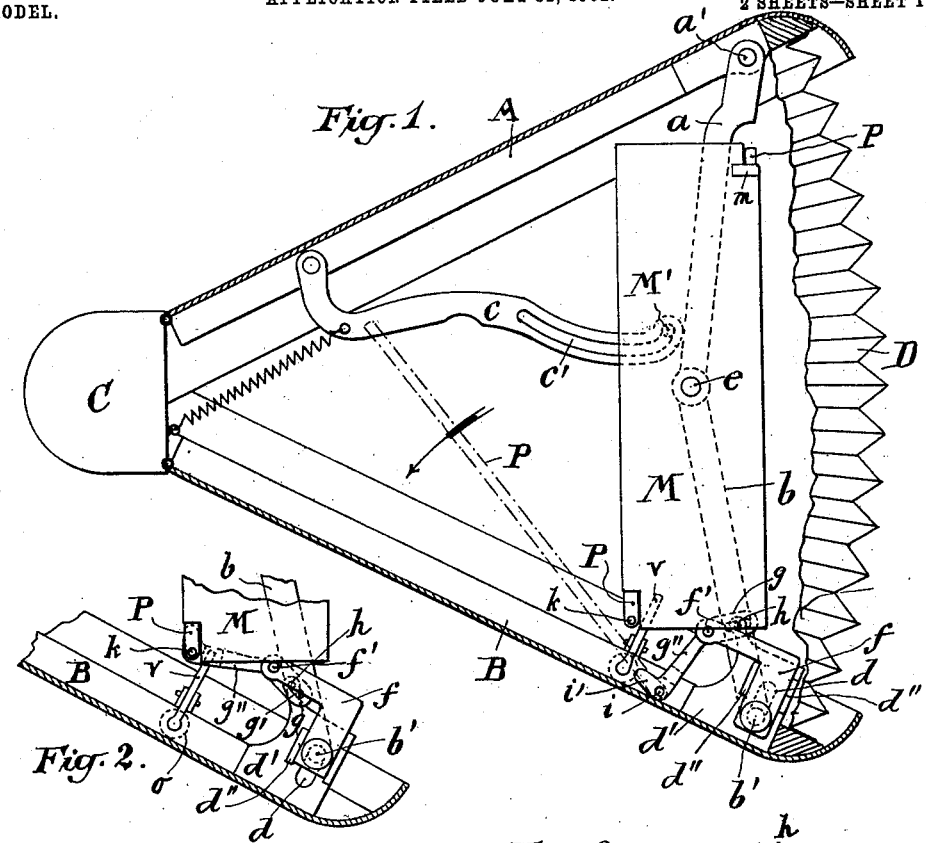
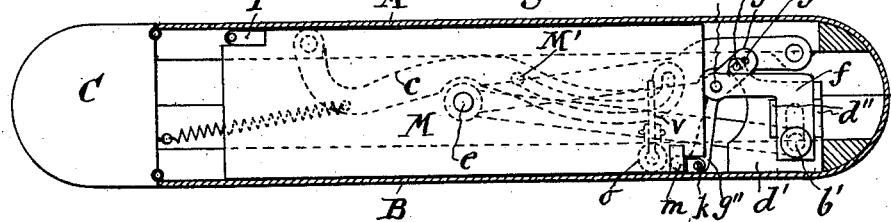
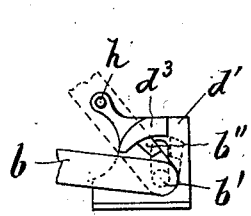
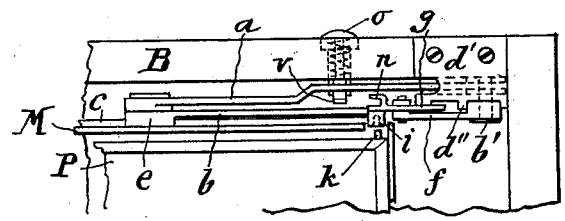
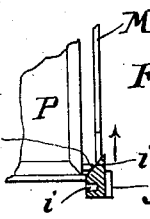
Witnesses:
Henry Krug
C. B. Pitney
Inventor:
Jean Antoine Pautasso,
by Drake & Co.,
Attys.

No. 757,836. PATENTED APR. 19, 1904.
J. A. PAUTASSO.
PHOTOGRAPHIC CAMERA.
APPLICATION FILED JULY 31, 1901.
NO MODEL. 2 SHEETS—SHEET 2.
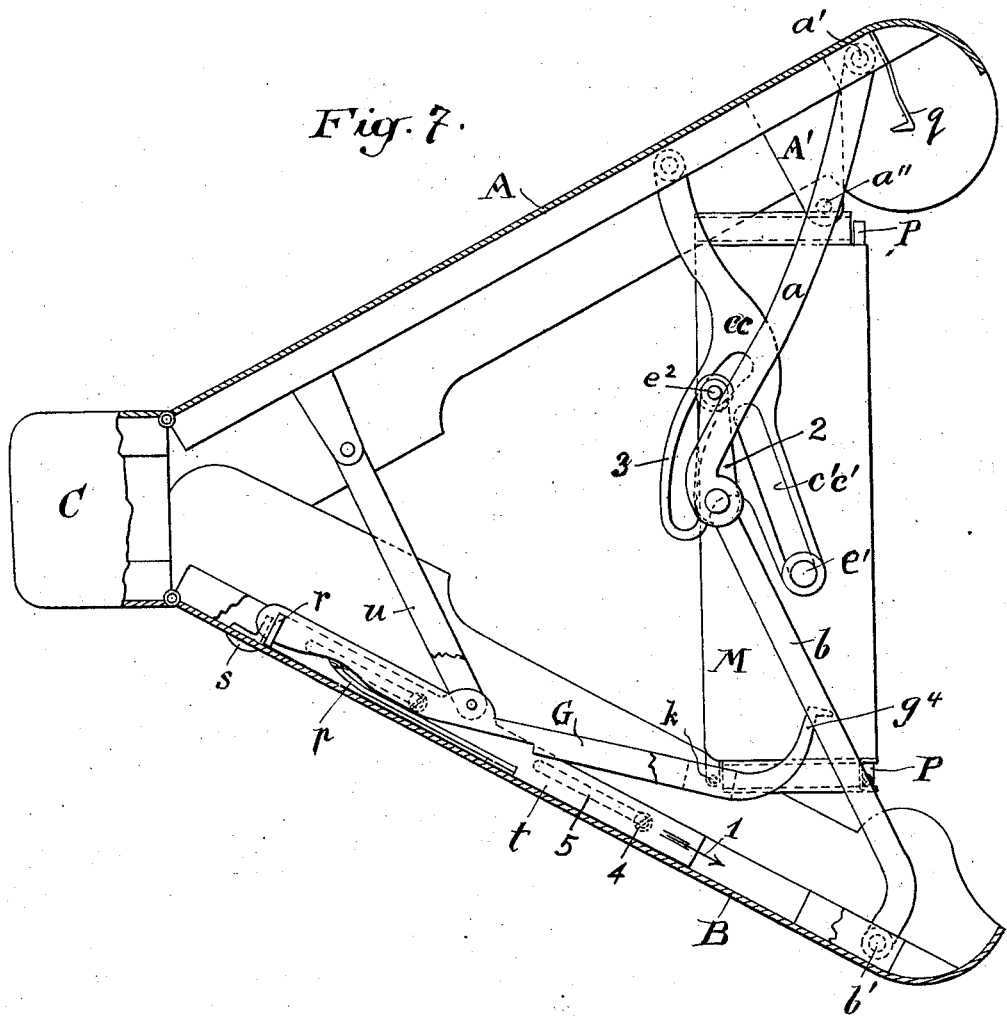
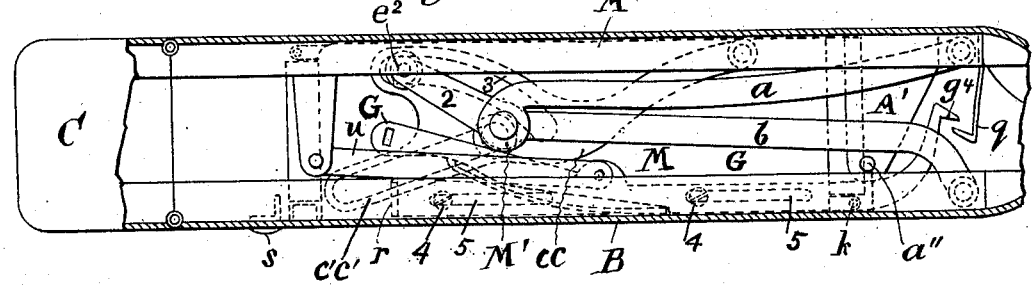
Witnesses=
Henry Krug
C. B. Pitney
Inventor=
Jean Antoine Pautasso,
By Drake & Co.
Attys.
THE NORRIS PETERS CO., PHOTO-LITHO., WASHINGTON, D. C.

No. 757,836. Patented April 19, 1904.

UNITED STATES PATENT OFFICE.

JEAN ANTOINE PAUTASSO, OF GENEVA, SWITZERLAND.

PHOTOGRAPHIC CAMERA.

SPECIFICATION forming part of Letters Patent No. 757,836, dated April 19, 1904.

Application filed July 31, 1901. Serial No. 70,313. (No model.)

*To all whom it may concern:*

Be it known that I, JEAN ANTOINE PAUTASSO, photographer, a subject of the King of Italy, residing at Geneva, Switzerland, have invented certain new and useful Improvements in Photographic Cameras; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The objects of this invention are to provide a compact and flat camera suited to the pocket when folded and adapted when opened or unfolded to automatically bring the photographically sensitive plate into the desired focal plane ready to receive light impression; to provide such a camera which will when closed or collapsed automatically carry the exposed or light-impressed plate beneath those previously exposed and the magazine to a position at right angles to the focal plane, so that the sides of the camera can be brought to be in parallel planes near one another to secure the compact and flat relation or condition above referred to; to obtain for these purposes a construction both simple and effective, and to obtain other advantages and results some of which may be referred to in connection with the description of the working parts.

The invention consists in the improved photographic camera and in the arrangements and combinations of parts of the same, all substantially as will be hereinafter set forth, and finally embraced in the clauses of the claim.

Referring to the accompanying drawings, in which like characters of reference indicate corresponding parts in each of the several figures, Figure 1 is a sectional view showing one side from the interior, the magazine being in its position at the focal plane. Fig. 2 is a portion of a similar view showing an exposed photographic plate caught by the plate-shifting lever, and Fig. 3 shows the position of the same parts when the camera is closed. Fig. 4 is a plan of a portion of the camera closed. Fig. 5 is a detail interior side elevation of the pivotal connection of a certain knuckle member to a hinged side of the camera. Fig. 6 shows from the front a portion of an exposed plate with the end of the plate-shifting lever about to engage the same; and Figs. 7 and 8 show in open and closed positions, respectively, a modified construction of the camera.

In said drawings, A B indicate two plates forming the upper and lower sides of the camera and being each hinged at one edge to a small box-like part C, forming the front end of the camera. At the vertical sides and back of the camera the said plates A B are joined by bellows D, adapted to exclude light from the interior, but permit a hinge action of the said plates, so that when opened or spread apart the said plates, bellows, and box inclose the dark chamber of the camera. The lens, lens-holder, shutter, lights, &c., are located in the said box C; but being of any common construction they are not shown.

The magazine M is formed in ordinary manner, comprising a metal frame having a number of spring-catches to hold the plates in proper position therein, so that they may be easily withdrawn one after another after exposure, and which catches, being old, are not shown.

The mechanism employed to swing the magazine and to remove each plate after exposure is in two similar sets or parts, one on one side of the magazine and the other on the opposite side, both parts being adapted to work in unison and engage the magazine and exposed plate at opposite sides for the sake of stability. In each set or side part are two knuckle members $a$ $b$, having their outer ends pivotally connected to the plates or sides A B at or near their lateral edges, as at $a$ $b$, respectively, and their other ends pivoted to one another and to the side of the magazine, as at $e$. The magazine is thus supported at its opposite edges and intermediate of its ends between said knuckle members $a$ $b$, and as said plates A B are separated or drawn apart at the rear and the knuckle members $a$ $b$ move at their connection $e$ rearward the said magazine is carried rearward or toward the focal plane of the camera, as will be clearly understood upon reference to Figs. 1 and 7. In closing the knuckle members fold forward or toward the lens-holder box C, and the magazine is accordingly carried forward. As the magazine M is thus carried backward or forward by the knuckle members it is turned pivotally on the connecting-pin $e$, so that when carried backward it will assume an endwise position between the sides $a$ $b$ of the camera in alinement with the focal plane, as shown in Figs. 1 and 7, and when carried forward it will be laid flatwise between said sides for folding the camera, as in Figs. 2 and 8. This movement is preferably accomplished by an arm or rod $c$, pivoted at one end upon one of the side plates, as A, at a point intermediate of the hinged connection of said plate with the box C and the pivotal connection $a'$ of the knuckle member $a$ to said plate. The opposite end of said arm $c$ has a slot $c'$, slidably receiving a pin $M'$ on the magazine, the said pin $M'$ lying eccentric to the pivot $e$ of the magazine, as clearly shown in Fig. 1. The said slot is at its outer end curved or offset, as at $c^2$, and a spiral spring $c^3$ extends from the opposite edge of the arm to the box C. Thus when the camera is open and the pin $M'$ lying in the said offset outer end of the slot, as shown in Fig. 1, there is enough resistance to slide said pin along its slot, so that the pivotal pin $e$ will be pushed forward in closing the camera before the pin $M'$ is moved. This swings the magazine into or nearly into its flatwise position for folding at the first pressure of the sides or plates A B together, and then continued pressure forces the pin $M'$ to slide in its slot $c'$ and carries the magazine inward toward the lens-box C. The magazine thus becomes pressed flatwise between the sides A B when the camera is closed. At the same time this is being done the exposed plate is being removed from the front of the magazine to the back of it preparatory to another light impression, and the various steps of this, which occur automatically upon the closing and opening of the camera between two exposures, will next be described. The pivots $b'$ of the hinging of the arms $b$ to the camera part B are each slidable in the slot $d$ of a support $d'$, fixed to the camera part B, so as to move a little distance at right angles to the said part B. The pivot normally lies at the inner end of said slot or end next the part B and occupies this position in the first part of the opening of the camera or until the magazine arrives in the focal plane. Further opening of the camera then pulls the pivot $b'$ to the outer end of the slot $d$. This motion is utilized to cause a lever $g$ to engage the foremost plate or one about to be exposed, so that reverse motion of the pivot at the beginning of closing the camera will remove said plate. To this end the pivot $b'$ carries an elbow-piece $f$, having one arm lying in alinement with the slot $d$ and between guides $d''$ on the support $d'$, so that it will move outward from the part B with the pivot. The outer arm of the elbow $f$ extends forwardly along the part B or toward the magazine, and upon it is fulcrumed the lever $g$ intermediate of its ends and adapted to swing parallel to or in the plane of the end of the magazine. The rear end of said lever $g$ is slotted, as at $g'$, to take a pin $h$ upon the fixed support $d'$, and thus as the pivot $b'$ slides away from the camera side B the forward end $g''$ of the lever $g$ is thrown also away from said side B to engage the lower corner of the foremost plate P. To effect such engagement, the said arm $g''$ is elastic laterally and is provided with an aperture or recess $i$ adjacent to its beveled extremity $i'$. Each plate P also has at its lower corner on each side a pin $k$, adapted to snap into the said aperture or recess $i$ when the arm $g''$ is swung toward the plate, as shown in Figs. 2 and 6. After exposure and at the beginning of closing the camera the knuckle-arm pivots $b'$ slide back in the slots $d'$, and this swings the levers $g$ and throws the light-impressed plate forwardly downward to lie upon the camera side B, as indicated in Fig. 1. The knuckle-levers $a$ $b$ then come into play, and the magazine is laid upon its back also on the side B and receives the light-impressed plate P. At this moment the levers $g$ are released from the pins $k$ of the plate by cams or inclines $m$ on the outer walls of the magazine.

To positively insure a proper sequence of the sliding and turning movements of the pivots $b'$, a block $d^3$, providing diverging shoulders, is fixed upon the support $d'$, and the arm $b$ has a stop $b''$, which when the pivot is sliding must clear one face of the shoulder before turning can take place and when the pivot is turning must clear the other face before sliding takes place, all as clearly illustrated in Fig. 5.

In order to enable the camera to be closed without thereby changing the plates, as may be desired, if after the camera has been opened one can or will not take a photograph for some reason or other means are provided for disengaging the lever-arms $g''$ from the pins $i$ of the first plate before closing the camera. As illustrating such means, I have shown a lever having one of its arms lying under a hook $n$ on the said lever-arm $g''$ when the latter has caught the plate and its other end providing a spring-button $o$, accessible from outside the camera, all as in Figs. 2 and 4. Obviously this lever may engage the lever-arm $g''$ in any other suitable manner, however, or other equivalent means could be employed in toto.

In the modified construction shown in Figs. 7 and 8 the magazine M is hinged at one end to one of the camera sides A, as at A', and the common pivotal pin of the two knuckle-arms $a$ $b$ is connected by an extension 2 of one of the arms, as $b$, with a stud $e^2$, lying in a curved slot 3 of the arm $c$ $c$, pivoted at its outer end to the camera part A near the point of pivoting A' of the magazine. Said slot 4 is so disposed that as the camera is closed the arm c c is folded back against the camera part A, and by means of a stud e' on the magazine, lying in another slot c' c' of the arm c c, said arm swings the magazine along with it. Plate-shifting levers G are disposed on opposite sides of the magazine, lying along the camera side B and each being fulcrumed upon a slide t, adapted to be reciprocated upon pins 4, lying in slots 5 of its sides, by an arm U, connected to the opposite side or part A of the camera. The fulcrum of said lever is intermediate of its ends, and the forward arm is normally forced away from the camera side B and slide t by a spring p, while the rear arm or one next to the focal plane is near its end adapted to engage a photographic plate in the magazine, as has been already described in connection with the arm g'' of the lever g. The extremity $g^4$ of said rear arm is adapted when the camera begins to open, the slide t being in extreme rearward position and the lever disengaged from the plates, as was described in connection with the lever g, to be engaged by a spring-hook q on the camera-section A and pulled outward toward position to engage the front plate of the magazine when the latter is brought in the focal plane, as shown in Fig. 7, the forward arm of the lever being thereby forced down upon the slide t against the power of the spring p and caught and held by a hook r. Continued opening of the camera then draws the slide t, and with it the lever G, forward and simultaneously swings the magazine into focal plane, whereupon the rear arm of said lever engages the front plate of the magazine.

After exposure the lever G is released from the hook r by a press-button s, whereupon the spring p swings said lever on its fulcrum and removes the exposed front plate, so that rearward movement of the slide t in closing the camera brings it into the right place to be pressed into the back of the magazine.

Having thus described my invention, what I claim is—

1. The combination with opposite camera sides connected to a lens-holder and adapted to be swung toward and away from each other, of a virtually-equilibrated plate-magazine between said sides, supporting means extending from both camera sides and being permanently connected to said magazine, said means being adapted to transmit movement of the camera sides to automatically turn said magazine into focal plane when the sides are opened and to lay it between said sides when the same are closed, and means for removing the foremost plate and holding it along the camera side against which the back of the magazine is brought in closing the camera.

2. The combination with opposite hinged camera sides connected by bellows-closure, of knuckle-levers hinged at their outer ends to said sides, a plate-magazine pivotally mounted upon the inner ends of said knuckle-levers, a guiding-lever projecting from one side and slidably engaging said magazine, a plate-manipulating lever on one of said sides, and means to operate said plate-manipulating lever.

3. The combination with two camera-sections adapted to be drawn apart and connected by bellows-closure, of a plate-magazine between said sections and free therefrom at its ends, supporting means permanently connecting said magazine intermediate of its ends to both camera-sections and adapted to swing it into transverse position when the said sections are opened apart and to bring it flatwise therebetween when closed, and means for removing the foremost plate and laying the same in the section against which the back of the magazine is brought in closing the camera.

4. The combination with two hinged camera-sections, of knuckle-levers joining said camera-sections, a plate-magazine pivotally mounted upon said knuckle-levers and supported thereby, means adapted to turn the said magazine in transverse position when the said camera-sections are opened apart and lay it flatwise therebetween when closed, means for locking the magazine in position when arriving in transverse position, means for releasing it and removing the foremost plate while in this position, and means for holding said plate upon the camera-section against which the back of the magazine is brought in closing the camera.

5. The combination with a plate-magazine pivotally mounted between two hinged camera-sections adapted to be opened apart, of supporting-levers for said magazine pivoted at their outer ends upon said two camera-sections and adapted to positively translate their reciprocal movements to said magazine to control its position between said camera-sections as they are opened and closed, means for removing the exposed plate and means for holding it along the camera-section against which the back of the magazine is brought in closing the camera.

6. The combination with a camera having opposite side sections adapted to swing toward and away from each other and a plate-magazine therebetween, of arms pivoted at their opposite ends to said side sections and having their adjacent ends pivoted together and pivotally connected to the magazine, means upon one section for guiding the pivotal movement of the magazine, and a plate-manipulating device secured to one of said sections.

7. The combination with a plate-magazine pivotally mounted between opposite camera sides connected to a lens-box and adapted to be swung toward and away from each other, of knuckle-levers pivoted at their outer ends to the said camera-sections and to the pivotal axis of the magazine at their opposite ends, guiding means slidably engaging said magazine to direct its movements, plate-manipulating levers upon one of the hinged camera-sections and adapted to engage and disengage the plates in turn as the hinged sections are opened and shut, and operating means for said plate-manipulating levers.

8. The combination with the hinged sides A, B, magazine M, pivotally mounted therebetween, and knuckle-levers $a$, $b$, one of which is pivoted to one of said sides in a slot $d$, of a plate-manipulating lever fulcrumed on said slotted side, and an arm $f$, extending from said knuckle-lever pivoted as set forth to said plate-lever.

9. The combination with the hinged sides A, B, and magazine M, pivotally mounted between said sides upon knuckle-levers $a$, $b$, pivoted at their ends to said hinged sides, one of said sides having a slot $d$, receiving the pivotal pin of its knuckle-lever and a shoulder $d^3$, at one side of said slot, and the said lever having a stop adapted to clear said shoulder only when the lever is extended, of plate-manipulating means connected to said lever and adapted to be operated by the sliding of said lever in said slot $d$.

10. The combination of the hinged sides A, B, one having a slot $d$, knuckle-levers $a$, $b$, pivoted at their outer ends to said sides, one in the said slot a magazine pivotally mounted upon the adjacent ends of said levers, stop means for causing the slipping of the knuckle-lever pivot in said slot at the predetermined time and plate-manipulating means connected to said slipping lever and operated thereby.

11. The combination with the hinged sides A, B, one having a slot $d$, knuckle-levers $a$, $b$, pivoted at their opposite ends to said hinged sides, one in the slot $d$, and a plate-magazine pivotally mounted on the meeting ends of said levers, of a plate-manipulating lever fulcrumed upon the said slotted side, means connecting said plate-lever to the knuckle-lever, and stop means for causing the slipping of said knuckle-lever at predetermined times.

12. The combination with the hinged sides A, B, knuckle-levers $a$, $b$, and magazine M, pivotally mounted on said levers, of a plate P, having a pin $k$, at its lateral edge and being exposed by said magazine, a plate-manipulating lever $g$, fulcrumed on one hinged side and adapted to engage said pin, and means connecting said plate-lever to a knuckle-lever to actuate the same.

In testimony that I claim the foregoing I have hereunto set my hand this 3d day of July, 1901.

JEAN ANTOINE PAUTASSO.

Witnesses:
R. ZOLLBERGER,
L. H. MUNION.